US006190295B1

(12) United States Patent
Kawano et al.

(10) Patent No.: US 6,190,295 B1
(45) **Date of Patent: *Feb. 20, 2001**

(54) CHARGING ROLL WHOSE RESISTANCE ADJUSTING LAYER CONTAINS INSULATING PARTICLES DISPERSED THEREIN

(75) Inventors: Atsuhiro Kawano, Shizuoka-ken; Kenichi Tsuchiya, Komaki, both of (JP)

(73) Assignee: Tokai Rubber Industries, Ltd., Komaki (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/234,795

(22) Filed: Jan. 20, 1999

(30) Foreign Application Priority Data

Feb. 24, 1998 (JP) ........................................ 10-041512

(51) Int. Cl.[7] ........................................ F16C 13/00

(52) U.S. Cl. ........................ 492/56; 399/176; 492/18

(58) Field of Search .................. 492/18, 56; 399/176, 399/174, 313

(56) References Cited

U.S. PATENT DOCUMENTS

| | | | | |
|---|---|---|---|---|
| 4,062,812 | | 12/1977 | Safford et al. . | |
| 5,312,662 | | 5/1994 | Ohta . | |
| 5,359,395 | | 10/1994 | Shimura et al. . | |
| 5,567,494 | * | 10/1996 | Ageishi et al. | 428/36.9 |
| 5,604,031 | | 2/1997 | Yamamoto et al. . | |
| 5,822,658 | * | 10/1998 | Tanka et al. | 492/18 |
| 5,851,657 | * | 12/1998 | Yasuno et al. | 492/56 |

FOREIGN PATENT DOCUMENTS

| | | |
|---|---|---|
| 0 308 185 | 3/1989 | (EP) . |
| 0 329 366 | 8/1989 | (EP) . |
| 0 417 801 | 3/1991 | (EP) . |
| 797 128 A2 | 9/1997 | (EP) . |
| 867 782 A2 | 9/1998 | (EP) . |
| 2-311867 | 12/1990 | (JP) . |
| 2-311868 | 12/1990 | (JP) . |
| 05 088 509 | 4/1993 | (JP) . |
| 5-88509 | 4/1993 | (JP) . |
| 07 140 760 | 6/1995 | (JP) . |
| 8-286470 | 11/1996 | (JP) . |
| 10 186 799 | 7/1998 | (JP) . |
| 10 319 678 | 12/1998 | (JP) . |

* cited by examiner

*Primary Examiner*—S. Thomas Hughes
*Assistant Examiner*—Marc W. Butler
(74) *Attorney, Agent, or Firm*—Burr & Brown

(57) ABSTRACT

A charging roll comprising a center shaft an electrically conductive rubber layer formed on an outer circumferential surface of the center shaft and having a relatively low hardness a resistance adjusting layer formed radially outwardly of the conductive rubber layer and a protective layer formed radially outwardly of the resistance adjusting layer. The resistance adjusting layer is formed of a rubber composition prepared by mixing a rubber material with particles of an electron-conductive material and particles of an electrically insulating material. The rubber composition comprises 10–50 parts by weight of the electrically insulating material per 100 parts by weight of the electron-conductive material.

18 Claims, 1 Drawing Sheet

CHARGING ROLL WHOSE RESISTANCE ADJUSTING LAYER CONTAINS INSULATING PARTICLES DISPERSED THEREIN

This application is based on Japanese Patent Application No. 10-41512 filed Feb. 24, 1998, the content of which is incorporated hereinto by reference.

CROSS REFERENCE TO RELATED APPLICATION

Not Applicable

BACKGROUND OF THE INVENTION

1. Field of the Invention

The present invention relates to a charging roll for use in an image forming apparatus such as an electrophotographic copying machine, laser beam printer, or the like.

2. Discussion of the Related Art

There is known a charging roll which is installed in an image forming apparatus such as an electrophotographic copying machine or printer, such that the charging roll is held in rolling contact with a photosensitive drum for charging the circumferential surface of the photosensitive drum. More specifically described, such a charging roll is used in a so-called "roll charging" method which is one of the known methods for charging a photosensitive drum on which an electrostatic latent image is formed. In the roll charging method, the charging roll to which a charging voltage is applied is held in pressing contact with the outer circumferential surface of the photosensitive drum. The charging roll and the photosensitive drum are rotated together so that the outer circumferential surface of the photosensitive drum is evenly charged by the charging roll before the surface is locally imagewise exposed to optical image signals.

In general, the charging roll includes an electrically conductive center shaft (metal core) and an electrically conductive rubber layer which has a low hardness and is formed of a rubber layer. The rubber layer consists of either a solid elastic body whose hardness is reduced by adding a large amount of softener, or a foamed body. The electrically conductive rubber layer is formed on the outer circumferential surface of the center shaft with a suitable thickness. On the outer circumferential surface of the conductive rubber layer, there are laminated a resistance adjusting layer and a protective layer in this order. An electrode layer is interposed, as needed, between the conductive rubber layer and the resistance adjusting layer.

In the charging roll constructed as described above, there has been employed the resistance adjusting layer which is formed of a rubber composition prepared by mixing a suitable rubber material with an ion- conductive material such as quaternary ammonium salt, so as to give the rubber composition a desired volume resistivity. However, the resistance adjusting layer containing the ionconductive material tends to suffer from a variation of its characteristics due to a change of the operating environment of the charging roll. To solve this problem, it is considered to form the resistance adjusting layer by using a rubber composition which includes electron-conductive particles such as carbon black particles as a conductive material.

However, the use of the charging roll whose resistance adjusting layer contains the electron-conductive particles deteriorates a quality of a reproduced or printed image, when the surface of the photosensitive drum has flaws such as pinholes, or any scratched, warred or otherwise damaged or defective portions. Namely, the reproduced image undesirably includes printing defects (e.g., pinhole defect) corresponding to the defective portions even when the surface defects of the photosensitive drum are not so considerably serious. For instance, an image area corresponding to a pinhole and its vicinity tends to be blurred.

SUMMARY OF THE INVENTION

It is therefore an object of the present invention to provide a charging roll which is capable of preventing occurrence of printing defects due to defective portions of the outer circumferential surface of a photosensitive drum used with the charging roll.

The above object may be achieved according to a principle of the present invention which provides a charging roll comprising: a center shaft; an electrically conductive rubber layer formed on an outer circumferential surface of the center shaft and having a relatively low hardness; a resistance adjusting layer formed radially outwardly of the conductive rubber layer; and a protective layer formed radially outwardly of the resistance adjusting layer. The resistance adjusting layer is formed of a rubber composition prepared by mixing a rubber material with particles of an electron-conductive material and particles of an electrically insulating material. The rubber composition comprises 10–50 parts by weight of the electrically insulating material per 100 parts by weight of the electron-conductive particles.

In the charging roll constructed according to the present invention, the resistance adjusting layer contains the predetermined amount of the elastically insulating particles as well as the electron-conductive particles, such that the electrically insulating particles and the electron-conductive particles are dispersed in the rubber material. This charging roll effectively prevents occurrence of the printing defects due to pinholes or other defective portions of the sur ace of the photosensitive drum.

According to one preferred form of the present invention, the electrically conductive rubber layer consists of a foamed body which is formed by foaming a foamable electrically conductive rubber composition.

According to another preferred form of the present invention, the electrically conductive rubber layer consists of a solid elastic body, and the charging roll further comprises an electrode layer interposed between the electrically conductive rubber layer and the resistance adjusting layer.

According to a further preferred form of the present invention, the rubber composition of the resistance adjusting layer comprises 30–100 parts by weight of the electron-conductive material per 100 parts by weight of the rubber material, so that the resistance adjusting layer has a desired electric conductivity (resistance value).

According to a still further preferred form of the present invention, the resistance adjusting layer has a thickness within a range of 100–300 μm.

According to a yet further preferred form of the present invention, the resistance adjusting layer has a volume resistivity within a range of $1\times10^5$–$\times10^{11}$ Ω·cm.

BRIEF DESCRIPTION OF THE DRAWINGS

The above and optional object, features, advantages and technical significance of the present invention will be better understood by reading the following detailed description of the presently preferred embodiments of the invention, when considered in conjunction of the accompanying drawings, in which.

DETAILED DESCRIPTION OF THE PREFERRED EMBODIMENT

Figure 1:
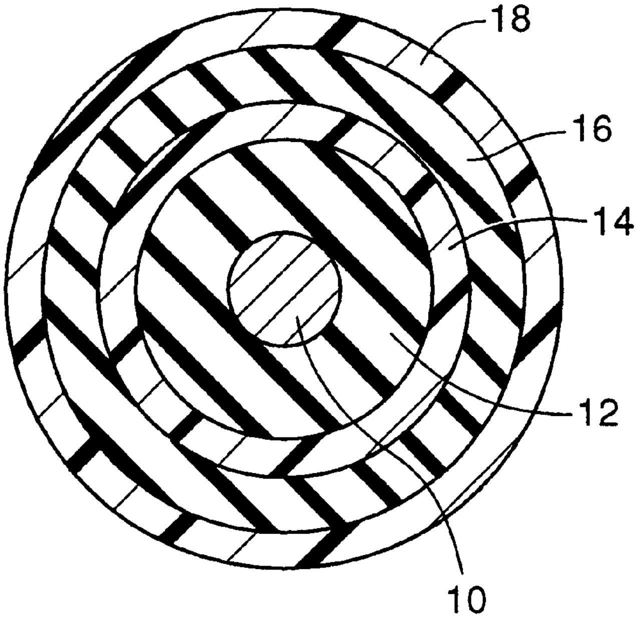
FIG. 1 is a transverse cross sectional view of a charging roll constructed according to one embodiment of the present invention.

Referring first to FIG. 1, there is shown a charging roll constructed according to one preferred embodiment of the present invention. The charging roll of FIG. 1 includes an electrically conductive center shaft (metal core) 10 made of a metallic material, and an electrically conductive rubber layer 12 which is formed on the outer circumferential surface of the center shaft 10 and constituted by an electrically conductive solid elastic body having a relatively low hardness. On the outer circumferential surface of the electrically conductive rubber layer 12, there are laminated an electrode layer 14, a resistance adjusting layer 16 and a protective layer 18 in the order of the description in the radially outward direction of the roll. Each of the layers 14, 16, 18 has a predetermined suitable thickness value.

Figure 2:
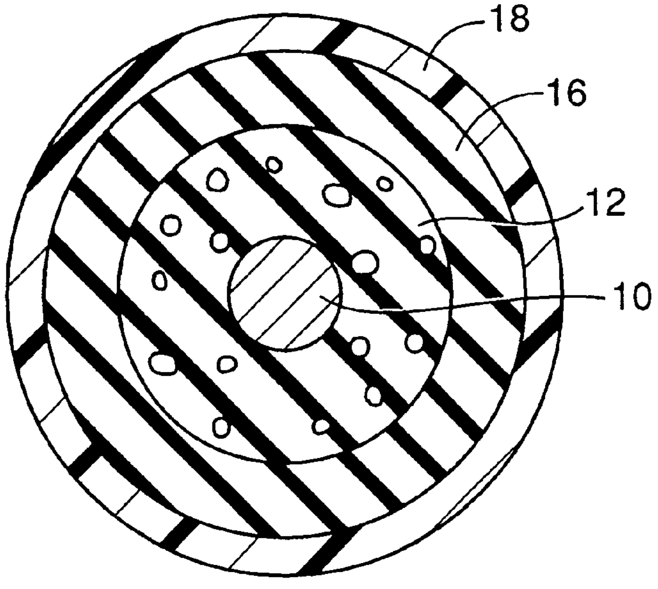
FIG. 2 is a transverse cross sectional view of a charging roll constructed according to another embodiment of the present invention.

Referring next to FIG. 2, there is shown another embodiment of the charging roll in which the electrically conductive rubber layer 12 is constituted by an electrically conductive foamed body, and an electrode layer is not interposed between the electrically conductive rubber layer 12 and the resistance adjusting layer 16.

Described more specifically, the center shaft 10 of the charging roll is made of a SUS material or a ferrous material such as SUM22 or SUM24, and is plated with nickel with a thickness of 3–20 μm by electroless plating. Generally, the center shaft 10 has a cylindrical shape and an outer diameter of about 5–10 mmϕ.

The electrically conductive rubber layer 12 formed on the outer circumferential surface of the center shaft 10 is formed of any known electrically conductive elastic material or any known electrically conductive foamable material, so that the rubber layer 12 to be obtained has a hardness adjusted to within a range of 5°–30° (Hs: JIS-A hardness, JIS: Japanese Industrial Standard) for giving the charging roll essentially required properties of low hardness (high softness) and high flexibility. The elastic material used for providing the electrically conductive solid elastic body may consist solely of any known rubber material such as EPDM, SBR, NR, polynorbornene rubber, or may be a mixture of two or more of the above indicated rubber materials. The foamable material used for providing the electrically conductive foamed body is not particularly limited, but may be suitably selected from among any known foamable materials such as NBR, hydrogenated NBR, urethane rubber, and EPDM, as long as the foamable material used has a sufficient resistance to fatigue of the obtained foamed body, and the obtained foamed body satisfies the characteristics required for the charging roll. The foamable material is foamed by using a known foaming agent such as azodicarbonamide, 4,4'-oxybisbenzene-suflonyl-hydrazide, dinitroso pentamethylene tetramine, or $NaHCO_3$. To the elastic material or the foamable material as described above, there is added an electrically conductive material such as carbon black, metal powder, conductive metal oxide or quaternary ammonium salt, so that the obtained electrically conductive rubber layer 12 has a desired volume resistivity value. When the rubber layer 12 is constituted by the solid elastic body, the elastic material for the solid elastic body further includes a relatively large amount of softener such as a process oil or a liquid polymer, so that the obtained rubber layer 12 has sufficiently low hardness and sufficiently high flexibility.

When the electrically conductive rubber layer 12 is constituted by the electrically conductive solid elastic body as described above, the obtained rubber layer 12 generally has a volume resistivity of $1\times10^1$–$1\times10^4$ Ω·cm, and a thickness of 1–10 mm, preferably, 2–4 mm. When the electrically conductive rubber layer 12 is constituted by the electrically conductive foamed body, the obtained rubber layer 12 generally has a volume resistivity of $1\times10^3$–$1\times10^6$ Ω·cm, and a thickness of 2–10 mm, preferably 3–6 mm.

The charging roll of FIG. 1 includes the electrode layer 14 disposed on the outer circumferential surface of the electrically conductive rubber layer 12. This electrode layer 14 functions to prevent a variation of the resistance value of the rubber layer 12, and also functions as a softener-blocking layer for effectively preventing the bleeding of the softener from the conductive rubber layer 12. The electrode layer 14 also functions to improve the stability of bonding between the conductive rubber layer 12 and the resistance adjusting layer 16. The electrode layer 14 is formed of a material similar to a conventionally used material for forming the electrode layer, e.g., a mixture of a nylon material such as N-methoxymethylated nylon and an electrically conductive material such as carbon black, metal powder, or conductive metal oxide. The electrode layer 14 made of the mixture thus prepared has a volume resistivity of $1\times10^1$–$1\times10^5$ Ω·cm, and a thickness of generally 3–20 μm, preferably 4–10 μm.

The charging roll of the present invention includes the resistance adjusting layer 16 which is disposed radially outwardly of the electrically conductive rubber layer 12 via the electrode layer 14 interposed therebetween in the first embodiment shown in FIG. 1, or which is formed directly on the outer circumferential surface of the rubber layer 12 in the second embodiment shown in FIG. 2. This resistance adjusting layer 16 controls the electric resistance of the charging roll, to thereby increase the withstand voltage or improve the dielectric breakdown resistance (resistance to leakage of electric current) of the charging roll. The primary characteristic of the present invention is to form the resistance adjusting layer 16 of a rubber composition consisting of a rubber material, particles of an electron-conductive material, and a predetermined amount of particles of an electrically insulating material. Namely, the resistance adjusting layer 16 in which the electrically insulating particles as well as the electron-conductive particles are dispersed in the rubber material is capable of eliminating or minimizing the conventionally experienced problem of deterioration of a reproduced image such as printing defects due to defective portions such as pinholes formed in the outer circumferential surface of a photosensitive drum used with the charging roll.

The rubber material of the rubber composition for producing the resistance adjusting layer 16 may be selected from among various kinds of known rubber materials such as NBR, epichlorohydrine rubber (especially ECO) and acrylic rubber, preferably selected from polar polymers such as NBR or ECO. The electron-conductive particles which gives the resistance adjusting layer 16 a desired value of electric conductivity is generally prepared from carbon blacks such as FEF, SRF, Ketjen black and acetylene black, but may be prepared from metal powder, conductive metal oxide such as $C\text{-}TiO_2$ or C-ZnO, graphite or carbon fiber. The electron-conductive particles have an average size or diameter of about 120 μm or smaller and a volume resistivity of about $1\times10^1$ Ω·cm or lower. The electron-conductive particles are added to and dispersed in the above-indicated rubber material so as to provide the resistance adjusting layer 16 containing the electron-conductive particles dispersed therein. The amount of the electron-conductive particles in the rubber composition is 30–100 parts by weight, preferably 50–90 parts by weight per 100 parts by weight of the rubber material which is a major component of the rubber composition.

The electrically insulating particles added to the rubber composition together with the electron-conductive particles, are suitably prepared from silica, but may be prepared from calcium carbonate or sheet-like particles such as mica or clay. The insulating particles have a volume resistivity of about $1\times10^{10}$ Ω·cm or higher, and an average diameter which is adjusted or determined depending upon the specific kind of the electrically insulating material e.g., an average diameter within a range of about 0.01 μm–40 μm.

The electrically insulating particles are contained in the rubber composition in an amount of 10–50 parts by weight, preferably 25–40 parts by weight per 100 parts by weight of the electron-conductive particles. If the amount of the insulating particles is smaller than the above-indicated lower limit of 10 parts by weight, the obtained charging roll cannot exhibit a desired effect for eliminating or reducing the deterioration of the reproduced image due to pinholes or other flaws or defects on the outer circumferential surface of the photo sensitive drum. If the amount of the insulating particles exceeds the above-indicated upper limit of 50 parts by weight, ease of extrusion and mixing or kneading operation of the obtained rubber composition is deteriorated.

To the rubber composition for forming the resistance adjusting layer 16, there are further added a vulcanizing agent, a vulcanization accelerator or promoter, and various kinds of additives such as an antistatic agent, zinc white, and stearic acid. The thus obtained rubber composition is vulcanized, to provide the desired resistance adjusting layer 16 having a volume resistivity of $1\times10^{5}$–$1\times10^{11}$ Ω·cm.

The resistance adjusting layer 16 is desired in general to have a thickness within a range of about 100–800 μm for giving the charging roll characteristics required in its use and manufacture. In view of the method for manufacturing the charging roll and the required hardness of the charging roll, it is considered that the charging roll having the resistance adjusting layer whose thickness is not larger than 200 μm is less likely to have a sufficiently even distribution of its resistance value and a desired dielectric breakdown resistance, and that the charging roll having the resistance adjusting layer whose thickness is not smaller than 700 μm tends to require a relatively long heating time for vulcanizing the resistance adjusting layer, leading to a risk of thermal deterioration of the underlying conductive rubber layer 12 due to the long heating time. In this respect, it is preferable that the resistance adjusting layer 16 has a thickness in a range of 200–700 μm.

On the outer circumferential surface of the resistance adjusting layer 16, there is formed the protective layer 18 as in the conventional charging roll. The protective layer 18 is formed of a mixture of a resin composition prepared by mixing a nylon material such as N-methoxymethylated nylon or a fluorine denatured acrylate resin and an electrically conductive material such as carbon black or conductive metal oxide. The protective layer 18 prepared from the above-described resin composition has a volume resistivity of $1\times10^{8}$–$1\times10^{13}$ Ω·cm and a thickness of 3–20 μm.

The charging rolls of the present invention as shown in FIGS. 1 and 2 may be produced in a known manner while using the above-described materials for the respective layers 12, 14, 16, 18. In general, two different methods are selectively employed. In one of the two methods, the electrically conductive rubber layer 12 is initially formed on the center shaft 10 by using the electrically conductive solid elastic material or the electrically conductive foamable material, according to a known method such as molding. On the outer circumferential surface of the obtained rubber layer 12, the electrode layer 14 (in the embodiment of FIG. 1 only), the resistance adjusting layer 16 and the protective layer 18 are formed with respective thickness values in the order of the description by a known coating method such as dipping, whereby the desired charging roll of FIG. 1 or 2 is obtained. In the other method, the materials for the electrically conductive foamed body and the resistance adjusting layer are concurrently passed through an extruder, so as to provide a two-layered laminar tube consisting of an inner layer that gives the electrically conductive rubber layer 12 and an outer layer that gives the resistance adjusting layer 16. The center shaft 10 is inserted into the thus prepared laminar tube. The thus obtained assembly is placed in a suitable mold and is subjected to a heat treating operation to vulcanize the rubber materials of the two layers of the tube and foam the inner layer, so that the electrically conductive rubber layer 12 consisting of the foamed body is formed around the center shaft 10 while the resistance adjusting layer 16 is formed on the outer circumferential surface of the foamed rubber layer 12. On the outer circumferential surface of the resistance adjusting layer 16, the protective layer 18 having a suitable thickness is formed by a known coating method such as dipping, whereby the desired charging roll of FIG. 2 is obtained.

In the charging roll constructed according to the present invention, the electrically conductive rubber layer 12, the electrode layer 14 (if provided), the resistance adjusting layer 16 and the protective layer 18 are laminated on one another in the order of the description, on the outer circumferential surface of the center shaft 10. The electrically conductive rubber layer 12 gives the charging roll the desired low hardness or high flexibility and excellent electric conductivity. The electrode layer 14 which is provided as needed serves to reduce a variation of the resistance value of the rubber layer 12. The resistance adjusting layer 16 provides the improved dielectric breakdown resistance of the charging roll. Moreover, the rubber composition for producing the resistance adjusting layer 16 includes the electrically insulating particles as well as the electron-conductive particles, such that the above-mentioned two kinds of particles are uniformly dispersed in the rubber material of the resistance adjusting layer 16. The resistance adjusting layer 16 constructed as described above effectively eliminates or minimizes the problem of deterioration of the reproduced image such as the printing defects due to the defective portions such as pinholes or scratches on the outer circumferential surface of the photosensitive drum.

EXAMPLES

To further clarify the principle of the present invention, there will be described some examples of the charging roll constructed according to the present invention. However, it is to be understood that the invention is by no means limited to the details of these examples, but may be embodied with various changes, modifications and improvements which may occur to those skilled in the art, without departing from the scope of the invention.

There were obtained six specimens of the charging roll as shown in FIG. 2, according to Examples 1–4 of the present invention and Comparative examples 1 and 2. Each of the roll specimens was produced in the following manner. Initially, there were prepared materials for the electrically conductive rubber layer (12), the resistance adjusting layer (16) and the protective layer (18), respectively. The material for the protective layer was dissolved in methyl ethyl ketone so as to provide a coating liquid having a suitable viscosity value. It is noted that the materials for the resistance adjusting layers of the respective roll specimens contain different amounts of electron-conductive particles and different amounts of electrically insulating particles as indicated in TABLE 1 below.

| | |
|---|---|
| <Composition for the electrically-conductive rubber layer> | |
| ethylene-propylene rubber | 100 wt. % |
| carbon black | 25 wt. % |
| zinc oxide | 5 wt. % |
| stearic acid | 1 wt. % |
| process oil | 30 wt. % |
| dinitrosopentamethylene tetramine (foaming agent) | 15 wt. % |
| sulfur | 1 wt. % |
| dibenzothiazolyl disulfid (vulcanization accelerator) | 2 wt. % |
| tetramethylthiuram momosulfide (vulcanization accelerator) | 1 wt. % |
| <Composition for the resistance adjusting layer> | |
| NBR (content of acrylonitrile: 33.5%) | 100 wt. % |
| FEF carbon black (electron-conductive particles) | 60–80 wt. % (See TABLE 1) |
| silica (electrically insulating particles) | 0–36 wt. % (See TABLE 1) |
| zinc oxide | 5 wt. % |
| stearic acid | 1 wt. % |
| dibenzothiazolyl disulfide | 1 wt. % |
| tetramethylthiuram monosulfide | 1 wt. % |
| sulfur | 1 wt. % |
| <Composition for the protective layer> | |
| fluorine-modified acrylate resin | 50 wt. % |
| fluorinated olefin resin | 50 wt. % |
| conductive titanium oxide | 100 wt. % |

The materials for the electrically conductive rubber layer and the resistance adjusting layer having the respective compositions as described above were concurrently passed through an extruder, so as to obtain a two-layered laminar tube consisting of an inner layer that gives the electrically conductive rubber layer and an outer layer that gives the resistance adjusting layer. Subsequently, an iron core member having an outside diameter of 6 mm and plated with nickel was inserted into an inner bore of the laminar tube after the cylindrical surface of the core member is subjected to a bonding treatment using a suitable electrically conductive adhesive. An assembly of the laminar tube and the core member inserted therein was then placed in position within a molding cavity of a cylindrical metal mold. Thereafter, the laminar tube was subjected to a heat treatment operation at a temperature of 170° C. for 30 minutes, for vulcanizing the rubber materials of the inner and outer layers of the tube and for foaming the inner layer, to thereby provide an intermediate rubber roll comprising a 3 mm-thick conductive rubber layer 12 formed of the electrically conductive rubber foam body and a 500 μm-thick resistance adjusting layer 16 formed of the non-foamable semi-conductive rubber material. The layers 12, 16 were integrally laminated in this order on the outer circumferential surface of the core member 10. After the intermediate rubber roll was taken out of the metal mold, it was subjected to a coating operation by dipping, using the coating liquid prepared for forming the protective layer, to thereby provide a 5 μm-thick protective layer 18 integrally formed on the outer circumferential surface of the obtained rubber roll. Thus, the six specimens of the charging roll of FIG. 2 were obtained.

The resistance adjusting layer of each of the specimen rolls according to Examples 1–4 according to the present invention contains the predetermined amount of electrically insulating particles, as indicated in TABLE 1 below. On the other hand, the resistance adjusting layer of the specimen roll according to the Comparative example 1 does not contain the insulating particles, and the resistance adjusting layer of the specimen roll according to the Comparative example 2 contains the insulating particles whose amount is outside the above-indicated predetermined range (10–50 parts by weight per 100 parts by weight of the electron-conductive particles) of the present invention, as also indicated in TABLE 1.

The thus obtained six charging rolls according to the Examples 1–4 and the Comparative examples 1 and 2 were evaluated by observing the printing defects which appeared on the images printed by using these charging rolls and by inspecting the ease of processing of the material for the resistance adjusting layer of each roll in the manner which will be described. The results of the evaluation are indicated in TABLE 1 below. The indicated results reveal that each of the charging rolls of the Examples 1–4 whose resistance adjusting layer contains the specific content of electrically insulating particles according to the present invention, are practically acceptable.

[Printing defect]

Each of the charging rolls was actually installed on a laser beam printer ("LASER-JET 4L" manufactured by JAPAN HEWLETT PACKARD. Co., Ltd., Japan). The photosensitive drum of the printer was provided on its outer circumferential surface with pinholes each having a diameter of 0.2 mm. Under the operating environment of 15° C. and 10% RH, a printing operation was performed according to test imaging optical signals which are designed to cause no image dots (black dots) to be printed on a sheet. The recording sheet was examined to check if there existed the printing defects in the form of black dots printed thereon corresponding to the pinholes formed on the outer circumferential surface of the photosensitive drum. There was measured the diameter of each area of the black dots, and the ratio of the measured diameter to the diameter of the corresponding pinhole was calculated. In the following TABLE 1, "◎" indicates that the obtained ratio is not smaller than 1.0 and is smaller than 1.4, "○" indicates that the obtained ratio is not smaller than 1.4 and is smaller than 1.8, and "Δ" indicated that the obtained ratio is not smaller than 1.8 and is smaller than 2.2, while "x" indicates that the obtained ratio is not smaller than 2.2. The charging roll is acceptable if the ratio is smaller than 2.2.

[Ease of processing of material for resistance adjusting layer]

Each of the materials for the resistance adjusting layers according to the Examples 1–4 and the Comparative examples 1 and 2 was evaluated in its ease of processing, that, ease of mixing and extrusion. In the following TABLE 1, "○" indicates that the ease of processing of the material is acceptable in both mixing and extrusion, "Δ" indicates that the extrusion of the material requires a relatively high pressure, which may cause low production efficiency of the resistance adjusting layer, and "x" indicates that the material cannot be suitably mixed and cannot be extruded.

TABLE 1

| | Examples | | | | Comparative Examples | |
|---|---|---|---|---|---|---|
| | 1 | 2 | 3 | 4 | 1 | 2 |
| Amount of electron-conductive particles (phr) | 80 | 60 | 80 | 60 | 80 | 60 |
| Amount of insulating particles (phr) | 23 | 21 | 10 | 25 | 0 | 36 |
| Resistance value of resistance adjusting layer (Ω•cm) | $1 \times 10^6$ | $1 \times 10^6$ | $1 \times 10^6$ | $1 \times 10^6$ | $1 \times 10^6$ | $1 \times 10^6$ |
| Printing defect of reproduced image | ○ | ◎ | Δ | ◎ | x | ◎ |
| Ease of processing of material for resistance adjusting layer | ○ | ○ | ○ | Δ | ○ | x |
| Amount of conductive particles: Amount of insulating particles | 1: 0.29 | 1: 0.35 | 1: 0.13 | 1: 0.42 | 1:0 | 1: 0.6 |

As is apparent from the results indicated in the above TABLE 1, each of the charging rolls constructed according to the present invention effectively eliminates or mitigates the problem of deterioration of the reproduced images such as the printing defects due to flaws such as pinholes and scratches present on the outer circumferential surface of the photosensitive drum, owing to the presence of the resistance adjusting layer formed of the rubber composition containing the electron-conductive particles and the electrically insulating particles in a proportion predetermined according to the present invention. TABLE 1 also indicates that each material for the resistance adjusting layer according to the present invention is satisfactory in its ease of processing.

What is claimed is:

1. A charging roll comprising:

a center shaft;

an electrically conductive rubber layer formed on an outer circumferential surface of said center shaft and having a relatively low hardness;

a resistance adjusting layer formed radially outwardly of said conductive rubber layer; and a protective layer formed radially outwardly of said resistance adjusting layer, said resistance adjusting layer being formed of a rubber composition prepared by mixing together three separate materials comprising a rubber material, particles of an electron-conductive material and particles of an electrically insulating material, said rubber composition comprising 10–50 parts by weight of said electrically insulating material per 100 parts by weight of said electron-conductive material.

2. A charging roll according to claim 1, wherein said rubber composition of said resistance adjusting layer comprises 25–40 parts by weight of said electrically insulating material per 100 parts by weight of said electron-conductive material.

3. A charging roll according to claim 1, wherein said electrically conductive rubber layer consists of a foamed body which is formed by foaming a foamable electrically conductive rubber composition.

4. A charging roll according to claim 3, wherein said foamed body has a thickness within a range of 2–10 mm and a volume resistivity within a range of $1\times10^3$–$1\times10^6$ Ω·m.

5. A charging roll according to claim 1, wherein said electrically conductive rubber layer consists of a solid elastic body, and said charging roll further comprises an electrode layer interposed between said electrically conductive rubber layer and said resistance adjusting layer.

6. A charging roll according to claim 5, wherein said solid elastic body has a thickness within a range of 1–10 mm and a volume resistivity within a range of $1\times10^1$–$1\times10^4$ Ω·cm.

7. A charging roll according to claim 5, wherein said electrode layer has a thickness within a range of 3–20 μm, and a volume resistivity within a range of $1\times10^1$–$1\times10^5$ Ω·cm.

8. A charging roll according to claim 1, wherein said rubber composition of said resistance adjusting layer comprises 30–100 parts by weight of said electron-conductive material per 100 parts by weight of said rubber material.

9. A charging roll according to claim 1, wherein said resistance adjusting layer has a thickness within a range of 100–800 μm.

10. A charging roll according to claim 1, wherein said resistance adjusting layer has a volume resistivity within a range of $1\times10^5$–$1\times10^{11}$ Ω·cm.

11. A charging roll according to claim 1, wherein said protective layer has a thickness within a range of 3–20 μm and a volume resistivity within a range of $1\times10^8$–$1\times10^{13}$ Ω·cm.

12. A charging roll according to claim 1, wherein said particles of said electron-conductive material have an average diameter of 120 μm or smaller.

13. A charging roll according to claim 1, wherein said electron-conductive material has a volume resistivity of $1\times10^1$ Ω·cm or lower.

14. A charging roll according to claim 1, wherein said particles of said electrically insulating material have an average particle diameter within a range of 0.01–40 μm.

15. A charging roll according to claim 1, wherein said electrically insulating material has a volume resistivity of at least $1\times10^{10}$ Ω·cm.

16. A charging roll according to claim 1, wherein said particles of said electrically insulating material are prepared from silica.

17. A charging roll according to claim 1, wherein said particles of said electrically insulating material are prepared from calcium carbonate.

18. A charging roll according to claim 1, wherein said particles of said electrically insulating material are prepared from at least one of mica and clay.

* * * * *

UNITED STATES PATENT AND TRADEMARK OFFICE

CERTIFICATE OF CORRECTION

PATENT NO. : 6,190,295 B1

DATED : February 20, 2001

INVENTOR(S) : Atsuhiro Kawano, Kenichi Tsuchiya

It is certified that error appears in the above-identified patent and that said Letters Patent is hereby corrected as shown below:

Item [57] Abstract,
Line 1, please change "comprising" to -- comprising: --, please change "shaft" to -- shaft; --
Line 4, please change "hardness" to -- hardness; --
Line 5, please change "layer" (1st occurrence) to -- layer; --

Signed and Sealed this

Thirtieth Day of October, 2001

*Attest:*

Nicholas P. Godici

NICHOLAS P. GODICI

*Attesting Officer* *Acting Director of the United States Patent and Trademark Office*